(12) United States Patent
Lin et al.

(10) Patent No.: US 9,571,236 B2
(45) Date of Patent: Feb. 14, 2017

(54) DOWNLINK CONTROL SIGNALLING TRANSMISSION METHOD AND DEVICE

(71) Applicant: CHINA ACADEMY OF TELECOMMUNICATIONS TECHNOLOGY, Beijing (CN)

(72) Inventors: Yanan Lin, Beijing (CN); Zukang Shen, Beijing (CN); Qianqian Si, Beijing (CN); Xueming Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/386,788

(22) PCT Filed: Mar. 6, 2013

(86) PCT No.: PCT/CN2013/072235
§ 371 (c)(1),
(2) Date: Sep. 19, 2014

(87) PCT Pub. No.: WO2013/139207
PCT Pub. Date: Sep. 26, 2013

(65) Prior Publication Data
US 2015/0043394 A1 Feb. 12, 2015

(30) Foreign Application Priority Data

Mar. 19, 2012 (CN) .......................... 2012 1 0073376

(51) Int. Cl.
*H04L 1/18* (2006.01)
*H04L 5/14* (2006.01)
(Continued)

(52) U.S. Cl.
CPC ............ *H04L 1/1893* (2013.01); *H04L 1/1812* (2013.01); *H04L 1/1861* (2013.01); *H04L 1/1864* (2013.01);
(Continued)

(58) Field of Classification Search
CPC ...... H04L 1/1861; H04L 1/1864; H04L 5/001; H04L 5/0055; H04L 1/1812; H04L 1/1893; H04L 5/14; H04L 5/1469; H04L 1/1822; H04W 72/0413
See application file for complete search history.

(56) References Cited

U.S. PATENT DOCUMENTS

| 2011/0083066 | A1* | 4/2011 | Chung et al. ................. 714/807 |
| 2012/0257552 | A1* | 10/2012 | Chen ....................... H04L 5/001 370/280 |
| 2014/0161002 | A1* | 6/2014 | Gauvreau ............. H04W 16/24 370/280 |

FOREIGN PATENT DOCUMENTS

| CN | 101478808 A | 7/2009 |
| CN | 101998507 A | 3/2011 |

(Continued)

OTHER PUBLICATIONS

3GPP TS 36.212 v10.5.0 (Mar. 13, 2012).*
(Continued)

*Primary Examiner* — Jae Y Lee
(74) *Attorney, Agent, or Firm* — Blakely, Sokoloff, Taylor & Zafman LLP

(57) ABSTRACT

The invention relates to the field of communications and provides a method of and apparatus for transmitting downlink control information, and the method includes: for transmission of DCI over any carrier, determining DAI information fields in uplink scheduling DCI and downlink scheduling DCI to be carried over the carrier and an HARQ process number information field in the downlink schedul- (Continued)

ing DCI dependent upon PDSCH HARQ feedback scheme currently in use; and determining a UL index information field in the uplink scheduling DCI to be carried over the carrier dependent upon a PUSCH scheduling scheme currently in use, so that an appropriate DCI design scheme is provided for an application scenario of across-system carrier aggregation to thereby satisfy a demand for the use of an evolved process in an LTE system and improve effectively the performance of the system.

20 Claims, 4 Drawing Sheets

(51) Int. Cl.
*H04W 72/04* (2009.01)
*H04L 5/00* (2006.01)
*H04W 72/12* (2009.01)

(52) U.S. Cl.
CPC ............ *H04L 5/14* (2013.01); *H04W 72/0413* (2013.01); *H04L 1/1822* (2013.01); *H04L 5/001* (2013.01); *H04L 5/0055* (2013.01); *H04L 5/1469* (2013.01); *H04W 72/12* (2013.01)

(56) References Cited

FOREIGN PATENT DOCUMENTS

| CN | 102045862 A | 5/2011 |
|---|---|---|
| CN | 102118756 A | 7/2011 |
| WO | WO 2011/047619 A1 | 4/2011 |

OTHER PUBLICATIONS

3GPP TS 36.213 v10.5.0 (Mar. 13, 2012).*
PCT International Search Report for PCT Counterpart Application No. PCT/CN2013/072235, 5 pages (including English translation), (Jun. 13, 2013).
PCT Written Opinion of the International Searching Authority for PCT Counterpart Application No. PCT/CN2013/072235, 8 pages (including English translation), (Jun. 13, 2013).
Ericsson, "Characterization of Downlink Control Signaling for LTE-Advanced", TSG-RAN WG1 Meeting #56, R1-090907, Athens, Greece, 6 pages, (Feb. 9-13, 2009).
Huawei, et al., "Ambiguity of DCI Format 4 and 1/2/2A/2B/2C Detection", 3GPP TSG RAN WG1 Meeting #65, R1-111821, Barcelona, Spain, 8 pages, (May 9-13, 2011).
PCT Notification Concerning Transmittal of International Preliminary Report on Patentability (Chapter I of the Patent Cooperation Treaty) for PCT Counterpart Application No. PCT/CN2013/072235, 13 pages (including English translation), (Oct. 2, 2014).

* cited by examiner

DOWNLINK CONTROL SIGNALLING TRANSMISSION METHOD AND DEVICE

CROSS-REFERENCE TO RELATED APPLICATIONS

This patent application is a U.S. National Stage Application under 35 U.S.C. §371 of International Application No. PCT/CN2013/072235, entitled DOWNLINK CONTROL SIGNALLING TRANSMISSION METHOD AND DEVICE, filed on Mar. 6, 2013, designating the United States, and claiming the benefit of Chinese Patent Application No. 201210073376.6, filed with the Chinese Patent Office on Mar. 19, 2012, and entitled "method of and apparatus for transmitting downlink control information", which was incorporated by reference in its entirety.

FIELD OF THE INVENTION

The present invention relates to the field of communications and particularly to a method of and apparatus for transmitting downlink control information.

BACKGROUND OF THE INVENTION

Three duplex modes of Frequency Division Duplex (FDD), Half-FDD (H-FDD) and Time Division Duplex (TDD) respectively are currently supported by a Long Term Evolution (LTE) system.

Particularly the FDD refers to uplink transmission and downlink transmission in different carrier frequency bands to allow concurrent signal reception and transmission for base station and User Equipment (UE) respectively; and the TDD refers to uplink transmission and downlink transmission in the same carrier frequency band to allow signal transmission and reception for base station and UE respectively in different periods of time.

One cell in LTE and earlier wireless communication systems is configured with only one carrier, and the bandwidth of a LTE system is up to 20 MHz, particularly as illustrated in FIG. 1.

In a Long Term Evolution-Advanced (LTE-A) system, the required peak rates of the system is up to 1 Gbps in the downlink and 500 Mbps in the uplink, as improved significantly over the LTE system. The required peak rates cannot be achieved with only one carrier of a maximum bandwidth of 20 MHz. It is thus necessary in the LTE-A system to extend the bandwidth available to the UE, and in view of this, the technology of Carrier Aggregation (CA) has been introduced where a plurality of consecutive or non-consecutive carriers from the same base station (eNB) are aggregated together to serve the UE concurrently with a desirable rate. These aggregated carriers are also referred to as Component Carriers (CCs). Each cell can be a component carrier, and cells (component carriers) from different eNBs cannot be aggregated. In order to ensure the UE of the LTE system to be able to operate in each of the aggregated carriers, the bandwidth of each of the carriers is not larger than 20 MHz, particularly as illustrated in FIG. 2. Four carriers can be aggregated by the base station of LTE-A as illustrated in FIG. 2, so that the base station can transmit data to the user equipment concurrently over the four carriers for an improved throughput of the system.

At present carrier aggregation across different systems cannot be supported in LTE, that is, an FDD carrier can only be aggregated with an FDD carrier, and a TDD carrier can only be aggregated with a TDD carrier.

In the LTE system, a radio frame is of 10 ms and a subframe is of 1 ms in both the FDD mode and the TDD mode. Seven TDD uplink-downlink configurations are defined for each radio frame of the TDD mode, particularly as depicted in Table 1, where D represents a DL subframe, U represents an UL subframe, and S represents a special subframe of the TDD system.

TABLE 1

(TDD uplink-downlink subframe configurations)

| Uplink-downlink | Subframe index | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the FDD mode of the LTE system, the UE receives downlink data in subframe n−4 and feeds back signaling of whether the data in the downlink subframe needs to be retransmitted, that is, feeds back Acknowledgement/Negative Acknowledgement (ACK/NACK) information, also referred to as a Physical Downlink Shared Channel Hybrid Automatic Repeat ReQuest (PDSCH HARQ), in uplink subframe n. With carrier aggregation, ACK/NACK information corresponding to a plurality of downlink carriers in subframe n−4 will be fed back concurrently in uplink subframe n.

In the TDD mode of the LTE system, the UE may feed back, ACK/NACK information corresponding to a plurality of downlink subframes, in the same uplink subframe, that is, the UE detects transmission of a Physical Downlink Shared Channel (PDSCH), or a Physical Downlink Control Channel (PDCCH) indicating downlink semi-persistent scheduling to be released, in downlink subframe n−k and feeds back corresponding ACK/NACK information in uplink subframe n, where k∈K, and values in the set K depend upon the TDD uplink-downlink configuration of the system and the particular subframe index, particularly as depicted in Table 2, where particularly for a special subframe of special subframe configuration 0 and 5 with a normal Cyclic Prefix (CP) or a special subframe of special subframe configuration 0 and 4 with an extended CP, and there is no ACK/NACK feedback for the special subframe, that is, the UE will not feed back ACK/NACK information for this special subframe.

TABLE 2

| Uplink-Downlink Configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

(Related TDD downlink K values: K: {$k_0, k_1, \ldots k_{M-1}$})

As depicted in Table 2, a plurality of radio frames are arranged in order, that is, if the last subframe in radio frame a is k, then the first subframe in radio frame a+1 is k+1, and Table 2 depicts values of K corresponding to the respective uplink subframes taking only one radio frame as an example, where n−k<0 indicates a downlink subframe in a preceding radio frame.

In the LTE system, Downlink Control Information (DCI) carried over a Physical Downlink Control Channel includes scheduling information, uplink power control information, etc., for downlink and uplink data transmission. The DCI intended for different uses and including different information contents can be in different formats, also referred to as DCI formats, a part of which may have a length dependent upon the system to which the DCI is applied, that is, the same DCI format may have different corresponding lengths in the FDD system and the TDD system because the different information fields or the different sizes of information fields specific to the different systems. For the sake of a convenient description, a DCI information field common to and with the same length in the FDD system and the TDD system will be referred to as a common information field, and a DCI information field specific to the different systems will be referred to as a dedicated information field. Generally the common information field includes the following information: a carrier indicator, allocation of resource blocks, a modulation and coding scheme, a new-data indicator, a transmit power indicator, pre-coding information, etc. The dedicated information fields includes:

(1) For DCI to schedule uplink data transmission:
1) There is no dedicated information field for FDD.
2) Dedicated information fields for TDD include:
An uplink (UL) index with a length of 2 bits, only in TDD uplink-downlink configuration 0, to indicate a scheduled uplink subframe.
A Downlink Assignment Index (DAI) with a length of 2 bits, in TDD uplink-downlink configurations 1 to 6, to indicate the number of scheduled downlink subframes among a plurality of downlink subframes for which ACK/NACK information is fed back in the same uplink subframe.

(2) For DCI to schedule downlink data transmission:
1) An FDD dedicated information field:
An HARQ process number with a length of 3 bits to indicate the serial number of a scheduled HARQ process.
2) TDD dedicated information fields:
An HARQ process number with a length of 4 bits.
A DAI with a length of 2 bits to indicate the number of scheduled downlink subframes among a plurality of downlink subframes for which ACK/NACK information is fed back in the same uplink subframe.

The DAI information field is introduced to address the problem of possible inconsistent understanding between the base station and the UE on the number of scheduled subframes when ACK/NACK information corresponding to a plurality of downlink subframes is fed back in a same uplink subframe in the TDD system, and also since at most eight HARQ processes are supported over a carrier in the FDD system whereas at most fifteen HARQ processes are supported in the TDD system, the HARQ process number information fields in the DCI for FDD and TDD are also different in length.

However carrier aggregation across different systems is not supported at present in LTE, so a design scheme has been absent so far for the respective information fields in the DCI for the TDD system and the FDD system with carrier aggregation. Aggregation of a TDD carrier and an FDD carrier may be supported in a later evolved LTE system. When a TDD carrier and an FDD carrier are aggregated, a Physical Downlink Shared Channel (PDSCH) HARQ feedback timing over the respective carriers is different from the original PDSCH HARQ feedback timing in the TDD system and the FDD system, so the use of the original DCI design scheme cannot be sufficient, for example, there will be a larger number of HARQ processes over an FDD carrier as a secondary carrier, and the larger number of HARQ processes cannot be supported with the existing HARQ process number information field in the FDD DCI.

SUMMARY OF THE INVENTION

Embodiments of the invention provide a method of and apparatus for transmitting downlink control information so as to indicate uplink and downlink data transmission in reasonable DCI for across-system carrier aggregation.

Particular technical solutions according to the embodiments of the invention are as follows:

There is a method of transmitting DCI, applicable to a scenario where a TDD carrier and an FDD carrier are aggregated, wherein for transmission of DCI over any carrier, the method includes:

determining DAI information fields in uplink scheduling DCI and downlink scheduling DCI to be carried over the carrier and an HARQ process number information field in the downlink scheduling DCI dependent upon PDSCH HARQ feedback scheme currently in use;

determining a UL index information field in the uplink scheduling DCI to be carried over the carrier dependent upon a PUSCH scheduling scheme currently in use; and generating the corresponding uplink scheduling DCI and downlink scheduling DCI from results of determining the respective information fields and transmitting the uplink scheduling DCI and the downlink scheduling DCI to the UE side over the carrier.

There is a method of processing DCI, applicable to a scenario where a TDD carrier and an FDD carrier are aggregated, wherein for processing of DCI transmitted over any carrier, the method includes:

determining DAI information fields in uplink scheduling DCI and downlink scheduling DCI to be carried over the carrier and an HARQ process number information field in the downlink scheduling DCI dependent upon PDSCH HARQ feedback scheme currently in use;

determining a UL index information field in the uplink scheduling DCI to be carried over the carrier dependent upon a PUSCH scheduling scheme currently in use; and parsing the uplink scheduling DCI and the downlink scheduling DCI according to results of determining the respective information fields upon reception of the uplink scheduling DCI and the downlink scheduling DCI, transmitted at the network side, over the carrier.

There is an apparatus for transmitting DCI, applicable to a scenario where a TDD carrier and an FDD carrier are aggregated, the apparatus including:

a master control unit configured, for transmission of DCI over any carrier, to determine DAI information fields in uplink scheduling DCI and downlink scheduling DCI to be carried over the carrier and an HARQ process number information field in the downlink scheduling DCI dependent upon PDSCH HARQ feedback scheme currently in use and to determine a UL index information field in the uplink scheduling DCI to be carried over the carrier dependent upon a PUSCH scheduling scheme currently in use; and a communication unit configured to generate the corresponding uplink scheduling DCI and downlink scheduling DCI from results of determining the respective information fields and to transmit the uplink scheduling DCI and the downlink scheduling DCI to the UE side over the carrier.

There is an apparatus for processing DCI, applicable to a scenario where a TDD carrier and an FDD carrier are aggregated, the apparatus including:

a processing unit configured, for processing of DCI transmitted over any carrier, to determine DAI information fields in uplink scheduling DCI and downlink scheduling DCI to be carried over the carrier and an HARQ process number information field in the downlink scheduling DCI dependent upon PDSCH HARQ feedback scheme currently in use and to determine a UL index information field in the uplink scheduling DCI to be carried over the carrier dependent upon a PUSCH scheduling scheme currently in use; and a communication unit configured to parse the uplink scheduling DCI and the downlink scheduling DCI according to results of to determine the respective information fields upon reception of the uplink scheduling DCI and the downlink scheduling DCI, transmitted at the network side, over the carrier.

In the embodiments of the invention, when a TDD carrier and an FDD carrier are aggregated, the base station determines respective information fields in DCI information in UE-specific search spaces corresponding to the respective carriers dependent upon PDSCH HARQ feedback scheme and a PUSCH scheduling scheme so that an appropriate DCI design scheme is provided for the application scenario of across-system carrier aggregation to thereby satisfy a demand for the use of an evolved process in the LTE system and improve effectively the performance of the system.

DETAILED DESCRIPTION OF THE EMBODIMENTS

Figure 1:
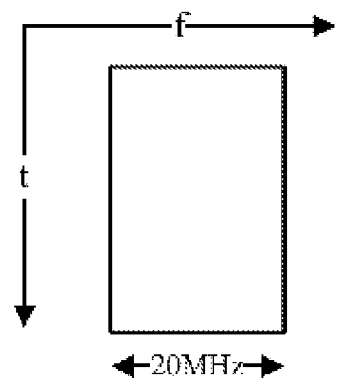
FIG. 1 is a schematic diagram of distribution of a carrier in the LTE system in the prior art.
Figure 2:
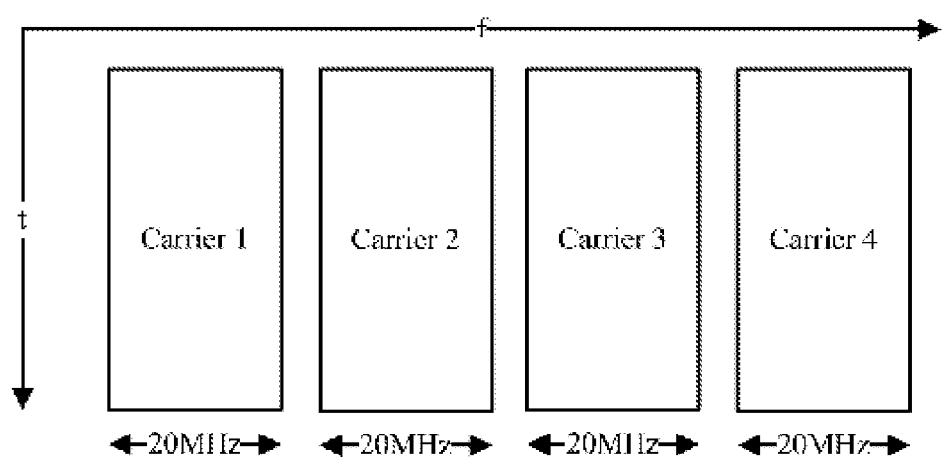
FIG. 2 is a schematic diagram of distribution of carriers in the LTE-A system implemented with the CA technology in the prior art.

A new scheme to compose DCI information fields is devised in embodiments of the invention for application scenarios of across-system carrier aggregation (e.g., a scenario where an FDD carrier and a TDD carrier are aggregated).

Preferred embodiments of the invention will be described below in details with reference to the drawings.

In the embodiments of the invention, the following several PDSCH HARQ feedback schemes are applicable to a system where a TDD carrier and an FDD carrier are aggregated:

In a first feedback scheme, PDSCH HARQ feedback is provided for both the TDD carrier and the FDD carrier following the FDD mode, that is, PDSCH HARQ feedback information of different downlink subframes is fed back respectively in different uplink subframes, and this scheme will be referred simply below to as a scheme 1.

Particularly, the ACK/NACK information corresponding to downlink subframe n−4 over both the TDD carrier and the FDD carrier is fed back in uplink subframe n; and this scheme is primarily applicable to an application scenario where the FDD carrier is a primary carrier and the TDD carrier is a secondary carrier. In this case, any downlink subframe over the TDD carrier corresponds to a separate uplink feedback subframe, that is, there is no such a case that a plurality of downlink subframes over the TDD carrier correspond to an uplink feedback subframe, so the original DAI information field in DCI will not be necessary; and there will be at most eight corresponding HARQ processes over the TDD carrier, so the original 4-bit HARQ process number information field can be reduced.

In a second feedback scheme, PDSCH HARQ feedback is provided for both the TDD carrier and the FDD carrier following the TDD mode, that is, PDSCH HARQ feedback information of different downlink subframes is fed back in the same uplink subframe, and this scheme will be referred simply below to as a scheme 2.

Particularly, ACK/NACK information corresponding to a plurality of downlink subframes n−k ($k \in \{k_0, k_1, \ldots k_{M-1}\}$ with M≥1) over the FDD carrier and the TDD carrier; and this scheme is primarily applicable to an application scenario where the TDD carrier is a primary carrier and the FDD carrier is a secondary carrier. In this case and in analog to the Rel-10 TDD system, the DAI information field needs to be introduced to address the problem of possible inconsistent understanding between a base station and a UE on the number of scheduled subframes when ACK/NACK information corresponding to a plurality of downlink subframes is fed back in a same uplink subframe; and moreover there will also be a larger number of HARQ processes over the FDD carrier, so the original HARQ process number information field needs to be extended as appropriately.

Moreover a third feedback scheme can alternatively be adopted, that is, PDSCH HARQ feedback is provided for the FDD carrier following the FDD mode (reference to the first feedback scheme for details); and PDSCH HARQ feedback is provided for the TDD carrier following the TDD mode (reference the second feedback scheme for details), and this scheme will be referred simply below to as a scheme 3.

On the other hand, in the embodiments of the invention, also the following several PUSCH scheduling schemes will be applicable over the respective carriers (the TDD carrier and the FDD carrier):

In a first scheduling scheme, scheduling information corresponding to PUSCH for different uplink subframes over the carrier is transmitted respectively in different downlink subframes, that is, scheduling information corresponding to PUSCH for an uplink subframe over the carrier is transmitted in a corresponding downlink subframe, and this scheme will be referred simply below to as a scheme X.

In a second scheduling scheme, scheduling information corresponding to PUSCH for a plurality of uplink subframes over the carrier is transmitted in a same downlink subframe, and this scheme will be referred simply below to as a scheme Y.

Figure 3:
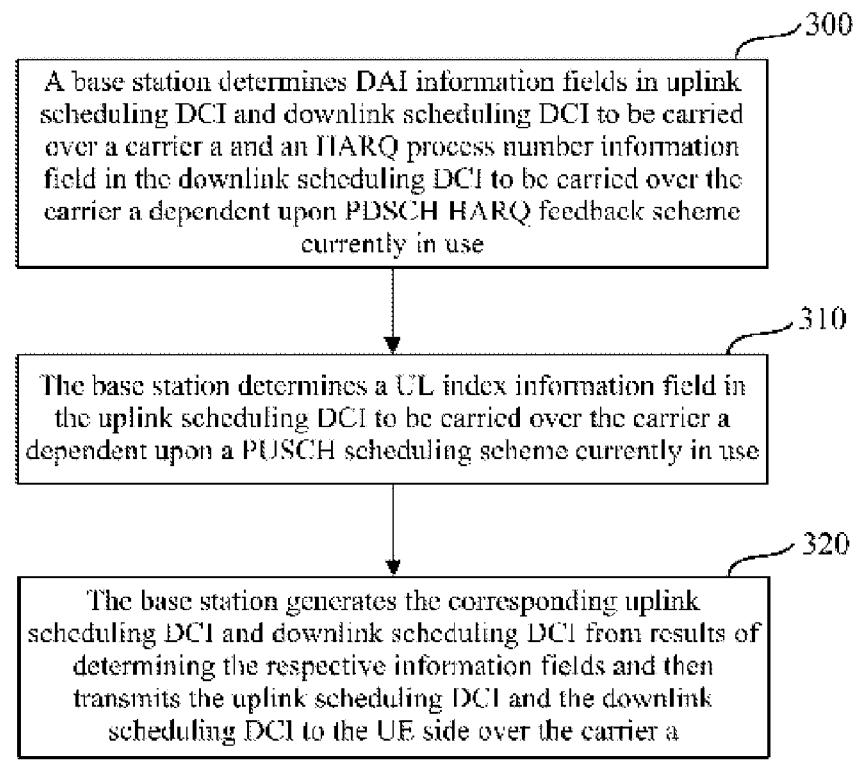
FIG. 3 is a flow chart of transmitting DCI by a base station according to an embodiment of the invention.

In the present embodiment, in the scenario where the TDD carrier and the FDD carrier are aggregated, the base station will set respective information fields in uplink scheduling DCI (DCI to schedule uplink data transmission) and downlink scheduling DCI (DCI to schedule downlink data transmission) to be carried over each of the carriers respectively in combination with the several PDSCH HARQ feedback schemes and PUSCH scheduling schemes above and generate the corresponding uplink scheduling DCI and downlink scheduling DCI from results of determining the respective information fields and then transmit the corresponding uplink scheduling DCI and downlink scheduling DCI to the UE side over the respective carriers. Referring to FIG. 3, in an embodiment of the invention, a base station transmits DCI over any carrier (referred below to as a carrier a) in the following detailed flow:

A particular process is as illustrated in FIG. 3:

In the step 300, a base station determines DAI information fields in uplink scheduling DCI and downlink scheduling DCI to be carried over a carrier a and an HARQ process number information field in the downlink scheduling DCI to be carried over the carrier a dependent upon PDSCH HARQ feedback scheme currently in use.

In the step 310, the base station determines an UL index information field in the uplink scheduling DCI to be carried over the carrier a dependent upon a PUSCH scheduling scheme currently in use.

In the embodiment of the invention, the step 300 and the step 310 above are performed particularly as follows:

A. PDSCH HARQ feedback is performed over the carrier a in the scheme 1.

(1) for Dedicated Information Fields in the Uplink Scheduling DCI.

If the base station performs PUSCH scheduling for the carrier a using the scheme X, then the base station sets neither the UL index information field nor the DAI information field in the uplink scheduling DCI as in the FDD system.

If the base station performs PUSCH scheduling for the carrier a using the scheme Y, then the base station does not set the DAI information field and sets the UL index information field as follows in the uplink scheduling DCI:

When the carrier a is a TDD carrier, a length of the UL index information field in the uplink scheduling DCI is set to M bits, where M is a preset value, e.g., 2 bits; or the length of the UL index information field in the uplink scheduling DCI is set as indicated by higher-layer signaling.

When the carrier a is a FDD carrier, the length of the UL index information field in the uplink scheduling DCI can be set to a constant value of $\lceil \log_2(P) \rceil$ bits, where P represents the largest number of a plurality of uplink subframes scheduled in a same downlink subframe as supported for use in the system; or the length of the UL index information field in the uplink scheduling DCI can be set as indicated by higher-layer signaling; or the length of the UL index information field in the uplink scheduling DCI can be set to $\lceil \log_2(Q) \rceil$ bits, where Q represents the largest number of a plurality of uplink subframes scheduled in a same downlink subframe over the currently aggregated carriers; or the length of the UL index information field in the uplink scheduling DCI can be set to A bits, where A represents the largest number of a plurality of uplink subframes scheduled in a same downlink subframe as supported for use in the system; or the length of the UL index information field in the uplink scheduling DCI can be set to B bits, where B represents the largest number of a plurality of uplink subframes scheduled in a same downlink subframe over the currently aggregated carriers.

(2) for Dedicated Information Fields in the Downlink Scheduling DCI.

The base station does not set the DAI information field in the downlink scheduling DCI as in the FDD system.

The base station sets a length of the HARQ process number information field to 3 bits, and if the carrier a is a TDD carrier, then the length of the original 4-bit HARQ process number information field can be reduced as appropriately.

If the carrier a is a secondary carrier, then a TPC information field in the downlink scheduling DCI is used to indicate a PUCCH resource. In the LTE Rel-10 carrier aggregation system, the TPC information field in the downlink scheduling DCI is originally applicable in DCIS to transmit PDSCH scheduling information or Semi-Persistent Scheduling (SPS) resource releasing indication, and in the embodiment of the invention, when the carrier a is a secondary carrier, the Transmit Power Control (TPC) information field in the downlink scheduling DCI is used to indicate a PUCCH resource over which ACK/NACK information is carried.

B. PDSCH HARQ feedback is performed over the carrier a in the scheme 2.

(1) for Dedicated Information Fields in the Uplink Scheduling DCI.

If the base station performs PUSCH scheduling for the carrier a using the scheme X, then the base station does not set the UL index information field and sets the DAI information field as follows (once a length of the DAI information field is determined, the length of the DAI information field is the same for all downlink subframes of a secondary carrier until it is reconfigured by the base station) in the uplink scheduling DCI:

The length of the DAI information field in the uplink scheduling DCI can be set to N bits, where N is a preset value, e.g., 2 bits or 3 bits; or the length of the DAI information field in the uplink scheduling DCI can be set as indicated by higher-layer signaling; or the length of the DAI information field in the uplink scheduling DCI can be determined implicitly by ACK/NACK information fed back by the UE, particularly by determining whether the numbers of ACK/NACK information bits fed back by the UE in all uplink subframes are equal to or below 11 bits, and if so, then setting the length of the DAI information field in the uplink scheduling DCI to 0 bit; otherwise, setting the length of the DAI information field in the uplink scheduling DCI to N bits, where N is a preset value, e.g., 2 bits or 3 bits.

Figure 4:
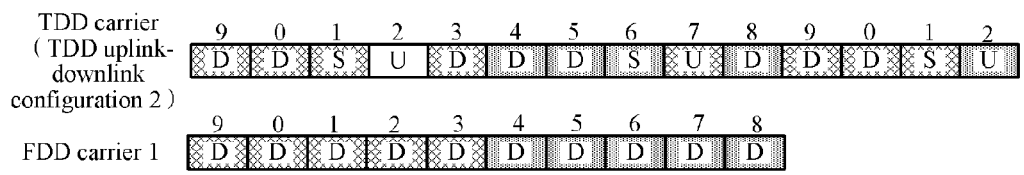
FIG. 4 is a schematic diagram of a first PDSCH HARQ feedback according to an embodiment of the invention.

For example, if the base station configures the UE with two aggregated downlink carriers and with ACK/NACK information to be fed back using PUCCH format 3, then reference is made to FIG. 4, where an uplink subframe filled with a pattern is a feedback subframe of ACK/NACK information corresponding to a downlink subframe filled with the same pattern, and at most 9-bit ACK/NACK information is fed back in both uplink subframe 2 and uplink subframe 7, so in this case the base station shall set the length of the DAI information field in the uplink scheduling DCI to 0 bit.

Figure 5:
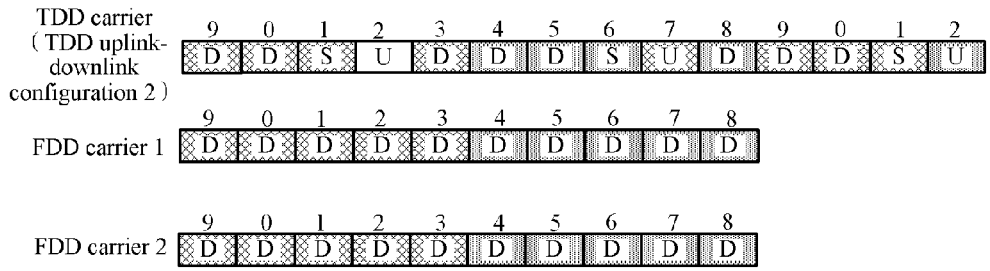
FIG. 5 is a schematic diagram of a second PDSCH HARQ feedback according to an embodiment of the invention.

In another example, if the base station configures the UE with three aggregated downlink carriers and with ACK/NACK information to be fed back using PUCCH format 3, then reference is made to FIG. 5, where an uplink subframe filled with a pattern is a feedback subframe of ACK/NACK information corresponding to a downlink subframe filled with the same pattern, and at most 14-bit ACK/NACK information is fed back in both uplink subframe 2 and uplink subframe 7, so the base station shall set the length of the DAI information field in the uplink scheduling DCI to N bits, where N is a preset value, e.g., 2 bits or 3 bits.

If the base station performs PUSCH scheduling for the carrier a using the scheme Y, then the base station sets the UL index information field and the DAI information field in the uplink scheduling DCI as follows:

When the carrier a is a TDD carrier, the length of the UL index information field in the uplink scheduling DCI is set to M bits, where M is a preset value, e.g., 2 bits; or the length of the UL index information field in the uplink scheduling DCI is set as indicated by higher-layer signaling.

When the carrier a is a FDD carrier, the length of the UL index information field in the uplink scheduling DCI can be set to a constant value of $\lceil \log_2(P) \rceil$ bits, where P represents the largest number of a plurality of uplink subframes scheduled in a same downlink subframe as supported for use in the system; or the length of the UL index information field in the uplink scheduling DCI can be set as indicated by higher-layer signaling; or the length of the UL index information field in the uplink scheduling DCI can be set to $\lceil \log_2(Q) \rceil$ bits, where Q represents the largest number of a plurality of uplink subframes scheduled in a same downlink subframe over the currently aggregated carriers; or the length of the UL index information field in the uplink scheduling DCI can be set to A bits, where A represents the largest number of a plurality of uplink subframes scheduled in a same downlink subframe as supported for use in the system; or the length of the UL index information field in the uplink scheduling DCI can be set to B bits, where B represents the largest number of a plurality of uplink subframes scheduled in a same downlink subframe over the currently aggregated carriers.

On the other hand, the length of the DAI information field in the uplink scheduling DCI can be set to N bits, where N is a preset value, e.g., 2 bits or 3 bits; or the length of the DAI information field in the uplink scheduling DCI can be set as indicated by higher-layer signaling; or the length of the DAI information field in the uplink scheduling DCI can be determined implicitly by ACK/NACK information fed back by the UE, particularly by determining whether the number of ACK/NACK information bits fed back by the UE in any of the uplink subframes is not above 11 bits, and if so, then setting the length of the DAI information field in the uplink scheduling DCI to 0 bit; otherwise, setting the length of the DAI information field in the uplink scheduling DCI to N bits, where N is a preset value, e.g., 2 bits or 3 bits.

(2) for Dedicated Information Fields in the Downlink Scheduling DCI.

The base station sets the HARQ process number information field and the DAI information field (once the length of the DAI information field is determined, the length of the DAI information field is common for all downlink subframes of a secondary carrier until it is reconfigured by the base station) in the downlink scheduling DCI as in the TDD system as follows:

The base station can set the length of the HARQ process number information field in the downlink scheduling DCI to a constant value of $\log_2(M)$ bits, where M represents the largest number of HARQ processes as supported in the system, and preferably $\log_2(M)=5$; or can set the length of the HARQ process number information field in the downlink scheduling DCI according to a reference TDD uplink-downlink configuration corresponding to PDSCH HARQ feedback of the FDD carrier, for example, if the reference TDD uplink-downlink configuration is TDD uplink-downlink configuration 5, then the base station sets the length of the HARQ process number information field in the downlink scheduling DCI to 5 bits, and if the reference TDD uplink-downlink configuration is one of TDD uplink-downlink configuration 0, 1, 2, 3, 4 and 6, then the base station sets the length of the HARQ process number information field in the downlink scheduling DCI to 4 bits. Apparently regardless of whichever reference TDD uplink-downlink configuration, if the carrier a is a FDD carrier, than the base station needs to extend the original 3-bit HARQ process number information field.

On the other hand, the DAI information field in the downlink scheduling DCI indicates the serial number of a scheduled downlink subframe among a plurality of downlink subframes for which PDSCH HARQ feedback is provided in the same uplink subframe, so the base station can set the length of the DAI information field in the downlink scheduling DCI to N bits, where N is a preset value, e.g., 2 bits or 3 bits; or the length of the DAI information field in the downlink scheduling DCI can be set as indicated by higher-layer signaling; or the length of the DAI information field in the downlink scheduling DCI can be determined implicitly by ACK/NACK information fed back by the UE, particularly by determining whether the numbers of ACK/NACK information bits fed back by the UE in all uplink subframes are equal to or below 11 bits, and if so, then setting the length of the DAI information field in the downlink scheduling DCI to 0 bit; otherwise, setting the length of the DAI information field in the downlink scheduling DCI to N bits, where N is a preset value, e.g., 2 bits or 3 bits, particularly as illustrated in FIG. 4 and FIG. 5, and a repeated description thereof will be omitted here.

If the carrier a is a secondary carrier, then the TPC information field in the downlink scheduling DCI is used to indicate a PUCCH resource, and the same PUCCH resource is indicated in a plurality of downlink subframes for which ACK/NACK information is transmitted in the same uplink subframe.

C. If the carrier a is a FDD carrier, then when PDSCH HARQ feedback is performed for the carrier a using the scheme 1, the base station sets the lengths of the respective information fields in the uplink scheduling DCI and the downlink scheduling DCI in the scheme A above; and if the carrier a is a TDD carrier, then when PDSCH HARQ feedback is performed for the carrier a using the scheme 2, the base station sets the lengths of the respective information fields in the uplink scheduling DCI and the downlink scheduling DCI in the scheme B above, and a repeated description thereof will be omitted here.

In the step 320, the base station generates the corresponding uplink scheduling DCI and downlink scheduling DCI from results of determining the respective information fields and then transmits the uplink scheduling DCI and the downlink scheduling DCI to the UE side over the carrier a.

In the embodiment of the invention, the base station will transmit the uplink scheduling DCI and the downlink scheduling DCI to the UE side over two sets of PDCCH resources, i.e., a PDCCH common space and a PDCCH UE-specific space, where the PDCCH common space is shared by all the UEs in a cell and primarily used to schedule common information, so the length of DCI transmitted in the PDCCH common space shall be definitively known to all the UEs and cannot be altered at will, and the PDCCH UE-specific space is used to transmit DCI for UE-specific data and specific to each UE, so in the embodiment of the invention, preferably the base station transmits the uplink scheduling DCI and the downlink scheduling DCI determined as in the step 300 and the step 310 over a PDCCH UE-specific space.

An implementation of the flow above will be further described below in details with reference to several particular application scenarios.

In an application scenario 1, a primary carrier is a FDD carrier, and a secondary carrier is a TDD carrier; and PUSCHs in different uplink subframes over the FDD carrier are scheduled respectively in different downlink subframes, and PUSCH scheduling over the TDD carrier corresponds to TDD uplink-downlink configurations 1 to 6, i.e., using the scheme 1 and the scheme X above, so uplink scheduling DCI and downlink scheduling DCI transmitted in PDCCH UE-specific spaces corresponding to the respective carriers is as depicted respectively Table 3 and Table 4:

TABLE 3

DCI Format 0 (the DCI format 0 corresponding to the FDD system)

| Information field | Information length (in bits) |
|---|---|
| Carrier index | 0 or 3 |
| DCI format index | 1 |
| Hop indication | 1 |
| Assignment of resource blocks | $\lceil \log_2(N_{RB}^{UL}(N_{RB}^{UL} + 1)/2) \rceil$, where $N_{RB}^{UL}$ represents an uplink bandwidth |
| Modulation and coding scheme | 5 |
| New-data indicator | 1 |
| Transmit power control | 2 |
| DMRS cyclic shift | 3 |
| CQI request | 1 or 2 |
| SRS request | 0 or 1 |
| Multi-cluster flag | 1 |

Table 3 depicts the DCI format 0 to schedule uplink data transmission, where the UL index information field is not set.

TABLE 4

DCI Format 1A (the DCI format 1A corresponding to the FDD system)

| Information field | Information length (in bits) |
|---|---|
| Carrier index | 0 or 3 |
| DCI format index | 1 |
| Hop indication | 1 |
| Assignment of resource blocks | $\lceil \log_2(N_{RB}^{DL}(N_{RB}^{DL} + 1)/2) \rceil$, where $N_{RB}^{DL}$ represents a downlink bandwidth |
| Modulation and coding scheme | 5 |
| HARQ process number | 3 |
| New-data indicator | 1 |
| Redundancy version | 2 |
| PUCCH transmit power control | 2 |
| SRS request | 0 or 1 |

Table 4 depicts the DCI format 1A to schedule downlink data transmission, where the HARQ process number information field is set with a length of 3 bits, and the 2-bit information in the PUCCH transmit power control information field (i.e., the TPC information field) over the FDD carrier is used to adjust PUCCH transmit power; and the 2-bit information in the PUCCH transmit power control information field over the TDD carrier is used to indicate a PUCCH resource over which the corresponding ACK/NACK information is transmitted.

In an application scenario 2, a primary carrier is a FDD carrier, and a secondary carrier is a TDD carrier; and PUSCHs in different uplink subframes over the FDD carrier are scheduled respectively in different downlink subframes, and the TDD carrier is used with TDD uplink-downlink configuration 0, that is, the TDD carrier corresponds to using the scheme 1 and the scheme X above, and the respective information fields in uplink scheduling DCI and downlink scheduling DCI thereof are set as in the application scenario 1, particularly as illustrated in Table 3 and Table 4; and the FDD carrier corresponds to using the scheme 1 and the scheme Y above, so uplink scheduling DCI and downlink scheduling DCI transmitted in a UE-specific space corresponding thereto is as depicted respectively in Table 5 and Table 6:

TABLE 5

DCI Format 0

| Information field | Information length (in bits) |
|---|---|
| Carrier index | 0 or 3 |
| DCI format index | 1 |
| Hop indication | 1 |
| Assignment of resource blocks | $\lceil \log_2(N_{RB}^{UL}(N_{RB}^{UL} + 1)/2) \rceil$, where $N_{RB}^{UL}$ represents an uplink bandwidth |
| Modulation and coding scheme | 5 |
| New-data indicator | 1 |
| PUCCH transmit power control | 2 |
| DMRS cyclic shift | 3 |
| UL index | 2 |
| CQI request | 1 or 2 |
| SRS request | 0 or 1 |
| Multi-cluster flag | 1 |

Table 5 depicts the DCI format 0 to schedule uplink data transmission, where the 2-bit UL index information field is set.

TABLE 6

DCI Format 1A (the DCI format 1A corresponding to the FDD system)

| Information field | Information length (in bits) |
|---|---|
| Carrier index | 0 or 3 |
| DCI format index | 1 |
| Hop indication | 1 |
| Assignment of resource blocks | $\lceil \log_2(N_{RB}^{DL}(N_{RB}^{DL} + 1)/2) \rceil$, where $N_{RB}^{DL}$ represents a downlink bandwidth |
| Modulation and coding scheme | 5 |
| HARQ process number | 3 |
| New-data indicator | 1 |
| Redundancy version | 2 |
| PUCCH transmit power control | 2 |
| SRS request | 0 or 1 |

Table 6 depicts the DCI format 1A to schedule downlink data transmission, where the 3-bit HARQ process number information field is set, and 2-bit information in the PUCCH transmit power control information field (i.e., the TPC information field) is used to indicate a PUCCH resource over which the corresponding ACK/NACK information is transmitted.

In an application scenario 3, a primary carrier is a TDD carrier, and a secondary carrier is a FDD carrier; and PUSCHs in different uplink subframes over the FDD carrier are scheduled respectively in different downlink subframes, and PUSCH scheduling over the TDD carrier corresponds to TDD uplink-downlink configuration 1 to 6, that is, using the scheme 2 and the scheme X above, so uplink scheduling DCI and downlink scheduling DCI transmitted in UE-specific spaces corresponding to the respective carriers is as depicted respectively in Table 7 and Table 8, where the length of the DAI information field over the FDD carrier is set to 2 bits:

TABLE 7

DCI Format 0 (the DCI format 0 corresponding to the TDD system)

| Information field | Information length (in bits) |
|---|---|
| Carrier index | 0 or 3 |
| DCI format index | 1 |
| Hop indication | 1 |
| Assignment of resource blocks | $\lceil \log_2(N_{RB}^{UL}(N_{RB}^{UL} + 1)/2) \rceil$, where $N_{RB}^{UL}$ represents an uplink bandwidth |
| Modulation and coding scheme | 5 |
| New-data indicator | 1 |
| Transmit power control | 2 |
| DMRS cyclic shift | 3 |
| DAI | 2 |
| CQI request | 1 or 2 |
| SRS request | 0 or 1 |
| Multi-cluster flag | 1 |

Table 7 depicts the DCI format 0 to schedule uplink data transmission, where the 2-bit DAI information field is set.

TABLE 8

DCI Format 1A

| Information field | Information length (in bits) |
|---|---|
| Carrier index | 0 or 3 |
| DCI format index | 1 |
| Hop indication | 1 |
| Assignment of resource blocks | $\lceil \log_2(N_{RB}^{DL}(N_{RB}^{DL} + 1)/2) \rceil$, where $N_{RB}^{DL}$ represents |

TABLE 8-continued

DCI Format 1A

| Information field | Information length (in bits) |
|---|---|
| | a downlink bandwidth |
| Modulation and coding scheme | 5 |
| HARQ process number | 5 |
| New-data indicator | 1 |
| Redundancy version | 2 |
| PUCCH transmit power control | 2 |
| DAI | 2 |
| SRS request | 0 or 1 |

Table 8 depicts the DCI format 1A to schedule downlink data transmission, where the 2-bit information in the PUCCH transmit power control information field over the FDD carrier is used to indicate a PUCCH resource over which the corresponding ACK/NACK information is transmitted, and the value of the information field is the same in a plurality of downlink subframes for which ACK/NACK information is transmitted in the same uplink subframe.

In an application scenario 4, a primary carrier is a TDD carrier, and a secondary carrier is a FDD carrier; and PUSCHs in a plurality of uplink subframes over the FDD carrier are scheduled in a same downlink subframe, and PUSCH scheduling over the TDD carrier corresponds to TDD uplink-downlink configuration 1 to 6, that is, the TDD carrier corresponds to using the scheme 2 and the scheme X above, so the respective information fields in uplink scheduling DCI and downlink scheduling DCI are set as in the application scenario 3, particularly as depicted in Table 7 and Table 8; and the FDD carrier corresponds to using the scheme 2 and the scheme Y above, so uplink scheduling DCI and downlink scheduling DCI transmitted in a UE-specific space corresponding thereto is as depicted respectively in Table 9 and Table 10:

TABLE 9

DCI Format 0 (the DCI format 0 corresponding to the TDD system)

| Information field | Information length (in bits) |
|---|---|
| Carrier index | 0 or 3 |
| DCI format index | 1 |
| Hop indication | 1 |
| Assignment of resource blocks | $\lceil \log_2(N_{RB}^{UL}(N_{RB}^{UL} + 1)/2) \rceil$, where $N_{RB}^{UL}$ represents an uplink bandwidth |
| Modulation and coding scheme | 5 |
| New-data indicator | 1 |
| Transmit power control | 2 |
| DMRS cyclic shift | 3 |
| UL index | 2 |
| DAI | 2 |
| CQI request | 1 or 2 |
| SRS request | 0 or 1 |
| Multi-cluster flag | 1 |

Table 9 depicts the DCI format 0 to schedule uplink data transmission, where the 2-bit DAI information field is set.

TABLE 10

DCI Format 1A

| Information field | Information length (in bits) |
|---|---|
| Carrier index | 0 or 3 |
| DCI format index | 1 |
| Hop indication | 1 |

TABLE 10-continued

DCI Format 1A

| Information field | Information length (in bits) |
|---|---|
| Assignment of resource blocks | $\lceil \log_2(N_{RB}^{DL}(N_{RB}^{DL} + 1)/2) \rceil$, where $N_{RB}^{DL}$ represents a downlink bandwidth |
| Modulation and coding scheme | 5 |
| HARQ process number | 5 |
| New-data indicator | 1 |
| Redundancy version | 2 |
| PUCCH transmit power control | 2 |
| DAI | 2 |
| SRS request | 0 or 1 |

Table 10 depicts the DCI format 1A to schedule downlink data transmission, where the 5-bit HARQ process number information field and the 2-bit DAI information field are set, 2-bit information in the PUCCH transmit power control information field over the FDD carrier is used to indicate a PUCCH resource over which the corresponding ACK/NACK information is transmitted, and the value of the information field is the same in a plurality of downlink subframes for which ACK/NACK information is transmitted in the same uplink subframe.

Figure 6:
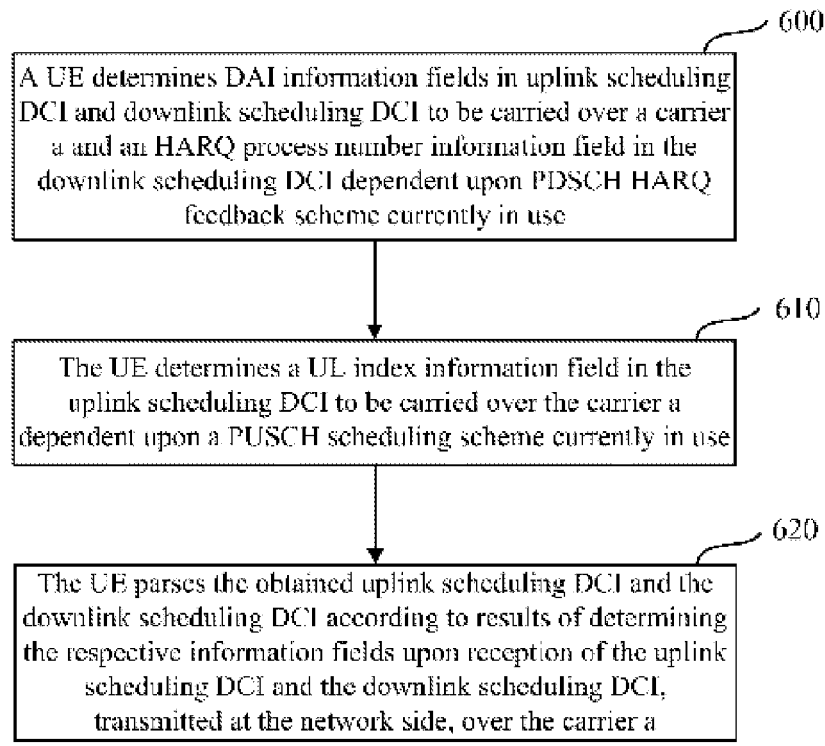
FIG. 6 is a flow chart of processing DCI by a user equipment according to an embodiment of the invention.

Based upon the embodiment above, correspondingly, referring to FIG. 6, received DCI is processed at the UE side for any carrier (still referred below to as a carrier a) in the following detailed flow:

In the step 600, a UE determines DAI information fields in uplink scheduling DCI and downlink scheduling DCI to be carried over a carrier a and an HARQ process number information field in the downlink scheduling DCI dependent upon PDSCH HARQ feedback scheme currently in use.

In the step 610, the UE determines an UL index information field in the uplink scheduling DCI to be carried over the carrier a dependent upon a PUSCH scheduling scheme currently in use.

In the embodiment of the invention, the step 600 and the step 610 above are performed particularly as follows:

A'. PDSCH HARQ feedback is performed over the carrier a using the scheme 1.

(1) for Dedicated Information Fields in the Uplink Scheduling DCI.

If a base station performs PUSCH scheduling for the carrier a using the scheme X, then the UE determines that neither the UL index information field nor the DAI information field is set in the uplink scheduling DCI.

If the base station performs PUSCH scheduling for the carrier a using the scheme Y, then the UE determines that the DAI information field is not set and sets the UL index information field as follows in the uplink scheduling DCI:

When the carrier a is a TDD carrier, the UE determines that the length of the UL index information field in the uplink scheduling DCI is set to M bits, where M is a preset value, e.g., 2 bits; or the UE determines the length of the UL index information field in the uplink scheduling DCI as indicated by higher-layer signaling.

When the carrier a is a FDD carrier, the UE can determine that the length of the UL index information field in the uplink scheduling DCI is set to a constant value of $\lceil \log_2(P) \rceil$ bits, where P represents the largest number of a plurality of uplink subframes scheduled in a same downlink subframe as supported for use in the system; or the UE can determine the length of the UL index information field in the uplink scheduling DCI as indicated by higher-layer signaling; or the UE can determine that the length of the UL index information field in the uplink scheduling DCI is set to $\lceil \log_2(Q) \rceil$ bits, where Q represents the largest number of a plurality of uplink subframes scheduled in a same downlink subframe over the currently aggregated carriers; or the UE can determine that the length of the UL index information field in the uplink scheduling DCI is set to A bits, where A represents the largest number of a plurality of uplink subframes scheduled in a same downlink subframe as supported for use in the system; or the UE can determine that the length of the UL index information field in the uplink scheduling DCI is set to B bits, where B represents the largest number of a plurality of uplink subframes scheduled in a same downlink subframe over the currently aggregated carriers.

(2) for Dedicated Information Fields in the Downlink Scheduling DCI.

The UE determines that the DAI information field is not set in the downlink scheduling DCI and the length of the HARQ process number information field is set to 3 bits.

If the carrier a is a secondary carrier, then the UE determines from a TPC information field in the downlink scheduling DCI a PUCCH resource indicated at the network side.

B'. PDSCH HARQ feedback is performed for the carrier a using the scheme 2.

(1) for Dedicated Information Fields in the Uplink Scheduling DCI.

If the base station performs PUSCH scheduling for the carrier a using the scheme X, then the UE determines that the UL index information field is not set and determines the DAI information field to be set as follows in the uplink scheduling DCI:

The UE can determine that the length of the DAI information field in the uplink scheduling DCI is set to N bits, where N is a preset value, e.g., 2 bits or 3 bits; or the UE can determine the length of the DAI information field in the uplink scheduling DCI as indicated by higher-layer signaling; or the UE can determine implicitly from ACK/NACK information fed back locally the length of the DAI information field in the uplink scheduling DCI, particularly by determining whether the numbers of ACK/NACK information bits fed back locally in all uplink subframes are equal to or below 11 bits, and if so, then determining that the length of the DAI information field in the uplink scheduling DCI is set to 0 bit; otherwise, setting the length of the DAI information field in the uplink scheduling DCI to N bits, where N is a preset value, e.g., 2 bits or 3 bits.

If the base station performs PUSCH scheduling for the carrier a using the scheme Y, then the UE determines the UL index information field and the DAI information field to be set in the uplink scheduling DCI as follows:

When the carrier a is a TDD carrier, the UE determines that the length of the UL index information field in the uplink scheduling DCI is set to M bits, where M is a preset value, e.g., 2 bits; or the UE determines the length of the UL index information field in the uplink scheduling DCI as indicated by higher-layer signaling.

When the carrier a is a FDD carrier, the UE can determine that the length of the UL index information field in the uplink scheduling DCI is set to a constant value of $\lceil \log_2(P) \rceil$ bits, where P represents the largest number of a plurality of uplink subframes scheduled in a same downlink subframe as supported for use in the system; or the UE can determine the length of the UL index information field in the uplink scheduling DCI as indicated by higher-layer signaling; or the UE can determine that the length of the UL index information field in the uplink scheduling DCI is set to $\lceil \log_2(Q) \rceil$ bits, where Q represents the largest number of a plurality of uplink subframes scheduled in a same downlink subframe over the currently aggregated carriers; or the UE can determine the length of the UL index information field in the uplink scheduling DCI to be A bits, where A represents the largest number of a plurality of uplink subframes scheduled in a same downlink subframe as supported for use in the system; or the UE can determine the length of the UL index information field in the uplink scheduling DCI to be B bits, where B represents the largest number of a plurality of uplink subframes scheduled in a same downlink subframe over the currently aggregated carriers.

On the other hand, the UE can determine that the length of the DAI information field in the uplink scheduling DCI is set to N bits, where N is a preset value, e.g., 2 bits or 3 bits; or the UE can determine the length of the DAI information field in the uplink scheduling DCI as indicated by higher-layer signaling; or the UE can determine implicitly from ACK/NACK information fed back locally the length of the DAI information field in the uplink scheduling DCI, particularly by determining whether the number of ACK/NACK information bits fed back locally in any of the uplink subframes is not above 11 bits, and if so, then determining that the length of the DAI information field in the uplink scheduling DCI is set to 0 bit; otherwise, determining that the length of the DAI information field in the uplink scheduling DCI is set to N bits, where N is a preset value, e.g., 2 bits or 3 bits.

(2) for Dedicated Information Fields in the Downlink Scheduling DCI.

The UE determines the HARQ process number information field and the DAI information field to be set in the downlink scheduling DCI as follows:

The UE can determine that the length of the HARQ process number information field in the downlink scheduling DCI is set to a constant value of $\log_2(M)$ bits, where M represents the largest number of HARQ processes as supported in the system, and preferably $\log_2(M)=5$; or the UE can determine the length of the HARQ process number information field in the downlink scheduling DCI according to a reference TDD uplink-downlink configuration corresponding to PDSCH HARQ feedback of the FDD carrier, for example, if the reference TDD uplink-downlink configuration is TDD uplink-downlink configuration 5, then the UE determines that the length of the HARQ process number information field in the downlink scheduling DCI is set to 5 bits, and if the reference TDD uplink-downlink configuration is one of TDD uplink-downlink configuration 0, 1, 2, 3, 4 and 6, then the UE determines that the length of the HARQ process number information field in the downlink scheduling DCI is set to 4 bits.

On the other hand, the DAI information field in the downlink scheduling DCI indicates the serial number of a scheduled downlink subframe among a plurality of downlink subframes for which PDSCH HARQ feedback is provided in the same uplink subframe, so the UE can determine that the length of the DAI information field in the downlink scheduling DCI is set to N bits, where N is a preset value, e.g., 2 bits or 3 bits; or the UE can determine the length of the DAI information field in the downlink scheduling DCI as indicated by higher-layer signaling; or the UE can determine implicitly from ACK/NACK information fed back locally the length of the DAI information field in the downlink scheduling DCI, particularly by determining whether the numbers of ACK/NACK information bits fed back locally in all uplink subframes are equal to or below 11 bits, and if so, then determining that the length of the DAI information field in the downlink scheduling DCI is set to 0 bit; otherwise, determining that the length of the DAI information field in the downlink scheduling DCI is set to N bits, where N is a preset value, e.g., 2 bits or 3 bits, particularly as illustrated in FIG. 4 and FIG. 5, and a repeated description thereof will be omitted here.

If the carrier a is a secondary carrier, then the UE determines from the TPC information field in the downlink scheduling DCI a PUCCH resource indicated at the network side, where the same PUCCH resource is indicated in a plurality of downlink subframes for which ACK/NACK information is transmitted in the same uplink subframe.

C'. If the carrier a is a FDD carrier, then when PDSCH HARQ feedback is performed for the carrier a using the scheme 1, the UE determines the lengths of the respective information fields in the uplink scheduling DCI and the downlink scheduling DCI in the scheme A' above; and if the carrier a is a TDD carrier, then when PDSCH HARQ feedback is performed for the carrier a using the scheme 2, the UE determines the lengths of the respective information fields in the uplink scheduling DCI and the downlink scheduling DCI in the scheme B' above, and a repeated description thereof will be omitted here.

Of course, the UE shall determine the respective information fields in the uplink scheduling DCI and the downlink scheduling DCI in the step 600 and the step 610 in either of the schemes to be consistent with the scheme in which the respective information fields are set at the base station side, where the UE can prescribe with the base station a scheme to determine the information fields or can determine the scheme by a common configuration by default, and a repeated description thereof will be omitted here.

In the step 620, the UE parses the obtained uplink scheduling DCI and the downlink scheduling DCI according to results of determining the respective information fields upon reception of the uplink scheduling DCI and the downlink scheduling DCI, transmitted by the network side, over the carrier a.

The UE needs to detect a PDCCH over two sets of resources, i.e., a PDCCH common space and a PDCCH UE-specific space, where the PDCCH common space is shared by all the UEs in a cell and primarily used to schedule common information, so the length of DCI transmitted in the PDCCH common space shall be definitively known to all the UEs and cannot be altered at will, and the PDCCH UE-specific space is used to transmit DCI for UE-specific data and specific to each UE, so in the embodiment of the invention, preferably the uplink scheduling DCI and the downlink scheduling DCI determined by the UE as described above is DCI transmitted over a PDCCH UE-specific space.

Figure 7:
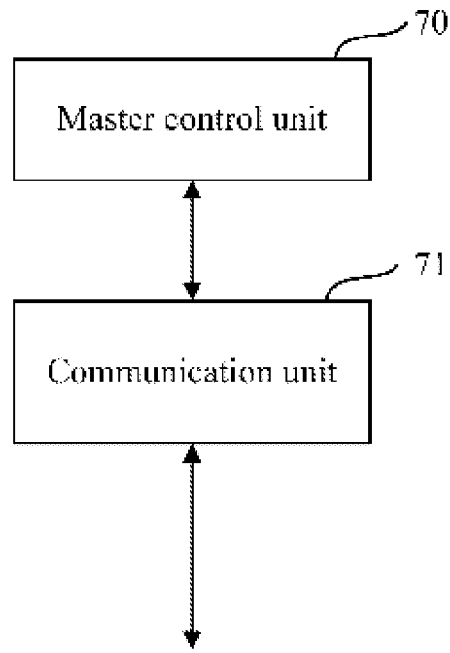
FIG. 7 is a schematic functionally structural diagram of functions of a base station according to an embodiment of the invention.
Figure 8:
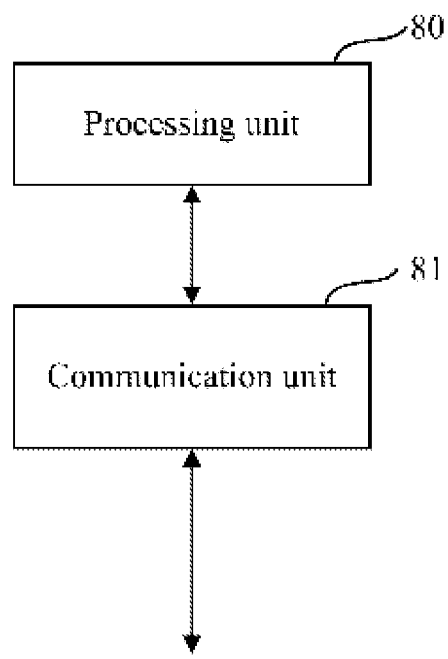
FIG. 8 is a schematic functionally diagram of functions of a user equipment according to an embodiment of the invention.

Based upon the embodiments above of the invention, referring to FIG. 7 and FIG. 8, in the embodiment of the inventions, The base station includes a master control unit 701 and a communication unit 71, where:

The master unit 701 is configured, for transmission of DCI over any carrier, to determine DAI information fields in uplink scheduling DCI and downlink scheduling DCI to be carried over the carrier and an HARQ process number information field in the downlink scheduling DCI dependent upon PDSCH HARQ feedback scheme currently in use, and to determine a UL index information field in the uplink scheduling DCI to be carried over the carrier dependent upon a PUSCH scheduling scheme currently in use; and The communication unit 71 is configured to generate the corresponding uplink scheduling DCI and downlink scheduling DCI from results of determining the respective information fields and then transmit the uplink scheduling DCI and the downlink scheduling DCI to the UE side over the carrier.

The UE includes a processing unit 80 and a communication unit 81, where:

The processing unit 80 is configured, for processing of DCI transmitted over any carrier, to determine DAI information fields in uplink scheduling DCI and downlink scheduling DCI to be carried over the carrier and an HARQ process number information field in the downlink scheduling DCI dependent upon PDSCH HARQ feedback scheme currently in use, and to determine a UL index information field in the uplink scheduling DCI to be carried over the carrier dependent upon a PUSCH scheduling scheme currently in use; and The communication unit 81 is configured to parse the obtained uplink scheduling DCI and the downlink scheduling DCI according to results of determining the respective information fields upon reception of the uplink scheduling DCI and the downlink scheduling DCI, transmitted at the network side, over the carrier.

In summary, in the embodiments of the invention, when a TDD carrier and an FDD carrier are aggregated, the base station determines respective information fields in DCI information in UE-specific search spaces corresponding to the respective carriers dependent upon PDSCH HARQ feedback scheme and a PUSCH scheduling scheme so that an appropriate DCI design scheme is provided for the application scenario of across-system carrier aggregation to thereby satisfy a demand for the use of an evolved process in the LTE system and improve effectively the performance of the system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of transmitting Downlink Control Information (DCI), applicable to a scenario where a Time Division Duplex (TDD) carrier and a Frequency Division Duplex (FDD) carrier are aggregated, wherein for transmission of DCI over any current carrier, the current carrier is a TDD carrier or an FDD carrier to be scheduled, the method comprises:

determining Downlink Assignment Index (DAI) information fields in uplink scheduling DCI and downlink scheduling DCI to be carried over the current carrier and a Hybrid Automatic Repeat ReQuest (HARQ) process number information field in the downlink scheduling DCI, dependent upon a duplex mode of a primary carrier, wherein a uplink scheduling DCI to be carried over a current TDD carrier comprises no DAI field the same as a uplink scheduling DCI carried over a primary FDD carrier, a downlink scheduling DCI to be carried over the current TDD carrier comprises no DAI field and 3 bits HARQ process number information field the same as downlink scheduling DCI carried over the primary FDD carrier, or a uplink scheduling DCI to be carried over a current FDD carrier comprises 2 bits of DAI field the same as a uplink scheduling DCI carried over a primary TDD carrier, a downlink scheduling DCI to be carried over the current FDD carrier comprises 2 bits of DAI and 4 bits of HARQ process number information fields the same as a downlink scheduling DCI carried over the primary TDD carrier;

determining an Uplink (UL) index information field in the uplink scheduling DCI to be carried over the current carrier dependent upon a Physical Uplink Shared Channel (PUSCH) scheduling scheme currently used for the current carrier;

generating the corresponding uplink scheduling DCI and downlink scheduling DCI from results of determining the respective information fields; and transmitting the uplink scheduling DCI and the downlink scheduling DCI to UE over the current carrier.

2. The method according to claim 1, wherein if the PUSCH scheduling scheme currently used for the current carrier is to transmit PUSCH scheduling information for different uplink subframes respectively in different downlink subframes, then determining an UL index information field in the uplink scheduling DCI to be carried over the current carrier comprises:
setting no UL index information field in the uplink scheduling DCI.

3. The method according to claim 1, wherein if the PUSCH scheduling scheme currently used for the current carrier is to transmit PUSCH scheduling information for different uplink subframes in a same downlink subframe, then determining an UL index information field in the uplink scheduling DCI to be carried over the current carrier comprises:
if the current carrier is a TDD carrier, then setting a length of the UL index information field in the uplink scheduling DCI to M bits, wherein M is a preset value; or setting the length of the UL index information field in the uplink scheduling DCI as indicated by higher-layer signaling; and
if the current carrier is an FDD carrier, then setting the length of the UL index information field in the uplink scheduling DCI to $\lceil \log_2(P) \rceil$ bits, wherein P represents the largest number of a plurality of uplink subframes scheduled in a same downlink subframe as supported for use in the system; or setting the length of the UL index information field in the uplink scheduling DCI as indicated by higher-layer signaling; or setting the length of the UL index information field in the uplink scheduling DCI to $\lceil \log_2(Q) \rceil$ bits, wherein Q represents the largest number of a plurality of uplink subframes scheduled in a same downlink subframe over the currently aggregated carriers; or setting the length of the UL index information field in the uplink scheduling DCI to A bits, wherein A represents the largest number of a plurality of uplink subframes scheduled in a same downlink subframe as supported for use in the system; or setting the length of the UL index information field in the uplink scheduling DCI to B bits, wherein B represents the largest number of a plurality of uplink subframes scheduled in a same downlink subframe over the currently aggregated carriers.

4. The method according to claim 1, wherein if the primary carrier is a FDD carrier, then determining DAI information fields in uplink scheduling DCI and downlink scheduling DCI to be carried over the current carrier and an HARQ process number information field in the downlink scheduling DCI comprises:
setting no DAI information field in the uplink scheduling DCI; and
setting no DAI information field and setting the HARQ process number information field to 3 bits in the downlink scheduling DCI.

5. The method according to claim 1, wherein if the primary carrier is a TDD carrier, then determining DAI information fields in uplink scheduling DCI and downlink scheduling DCI to be carried over the current carrier and an HARQ process number information field in the downlink scheduling DCI comprises:
setting a length of the DAI information field in the uplink scheduling DCI to N bits, wherein N is a preset value; or setting the length of the DAI information field in the uplink scheduling DCI as indicated by higher-layer signaling; or setting the length of the DAI information field in the uplink scheduling DCI according to ACK/NACK information fed back by the UE;
setting a length of the HARQ process number information field in the downlink scheduling DCI to $\log_2(M)$ bits, wherein M represents the largest number of HARQ processes as supported in the system; or setting the length of the HARQ process number information field in the downlink scheduling DCI according to a reference TDD uplink-downlink configuration corresponding to PDSCH HARQ feedback of the FDD carrier; and
setting a length of the DAI information field in the downlink scheduling DCI to N bits, wherein N is a preset value; or setting the length of the DAI information field in the downlink scheduling DCI as indicated by higher-layer signaling; or setting the length of the DAI information field in the downlink scheduling DCI according to ACK/NACK information fed back by the UE.

6. A method of processing Downlink Control Information (DCI), applicable to a scenario where a Time Division Duplex (TDD) carrier and a Frequency Division Duplex (FDD) carrier are aggregated, wherein for processing of DCI transmitted over any current carrier, the current carrier is a TDD carrier or an FDD carrier to be scheduled, the method comprises:
determining Downlink Assignment Index (DAI) information fields in uplink scheduling DCI and downlink scheduling DCI to be carried over the current carrier and a Hybrid Automatic Repeat ReQuest (HARQ) process number information field in the downlink scheduling DCI dependent upon a duplex mode of a primary carrier, wherein a uplink scheduling DCI to be carried over a current TDD carrier comprises no DAI field the same as a uplink scheduling DCI carried over a primary FDD carrier, a downlink scheduling DCI to be carried over the current TDD carrier comprises no DAI field and 3 bits HARQ process number information field the same as downlink scheduling DCI carried over the primary FDD carrier, or a uplink scheduling DCI to be carried over a current FDD carrier comprises 2 bits of DAI field the same as a uplink scheduling DCI carried over a primary TDD carrier, a downlink scheduling DCI to be carried over the current FDD carrier comprises 2 bits of DAI and 4 bits of HARQ process number information fields the same as a downlink scheduling DCI carried over the primary TDD carrier;
determining an Uplink (UL) index information field in the uplink scheduling DCI to be carried over the current carrier dependent upon a Physical Uplink Shared Channel (PUSCH) scheduling scheme currently used for the current carrier;
parsing the uplink scheduling DCI and the downlink scheduling DCI according to results of determining the respective information fields upon reception of the uplink scheduling DCI and the downlink scheduling DCI, transmitted from network side, over the current carrier.

7. The method according to claim 6, wherein if the PUSCH scheduling scheme currently used for the current carrier is to transmit PUSCH scheduling information for different uplink subframes respectively in different downlink subframes, then determining an UL index information field in the uplink scheduling DCI to be carried over the current carrier comprises:
determining no UL index information field to be set in the uplink scheduling DCI.

8. The method according to claim 6, wherein if the PUSCH scheduling scheme currently used for the current carrier is to transmit PUSCH scheduling information for different uplink subframes in a same downlink subframe, then determining an UL index information field in the uplink scheduling DCI to be carried over the current carrier comprises:

if the current carrier is a TDD carrier, then determining a length of the UL index information field in the uplink scheduling DCI to be set to M bits, wherein M is a preset value; or determining the length of the UL index information field in the uplink scheduling DCI as indicated by higher-layer signaling; and if the current carrier is an FDD carrier, then determining the length of the UL index information field in the uplink scheduling DCI to be set to $\lceil \log_2(P) \rceil$ bits, wherein P represents the largest number of a plurality of uplink subframes scheduled in a same downlink subframe as supported for use in the system; or determining the length of the UL index information field in the uplink scheduling DCI as indicated by higher-layer signaling; or determining the length of the UL index information field in the uplink scheduling DCI to be set to $\lceil \log_2(Q) \rceil$ bits, wherein Q represents the largest number of a plurality of uplink subframes scheduled in a same downlink subframe over the currently aggregated carriers; or determining the length of the UL index information field in the uplink scheduling DCI to be set to A bits, wherein A represents the largest number of a plurality of uplink subframes scheduled in a same downlink subframe as supported for use in the system; or determining the length of the UL index information field in the uplink scheduling DCI to be set to B bits, wherein B represents the largest number of a plurality of uplink subframes scheduled in a same downlink subframe over the currently aggregated carriers.

9. The method according to claim 6, wherein if the primary carrier is a FDD carrier, then determining DAI information fields in uplink scheduling DCI and downlink scheduling DCI to be carried over the current carrier and an HARQ process number information field in the downlink scheduling DCI comprises:

determining no DAI information field to be set in the uplink scheduling DCI; and determining no DAI information field to be set and the HARQ process number information field to be set to 3 bits in the downlink scheduling DCI.

10. The method according to claim 6, wherein if the primary carrier is a TDD carrier, then determining DAI information fields in uplink scheduling DCI and downlink scheduling DCI to be carried over the current carrier and an HARQ process number information field in the downlink scheduling DCI comprises:

determining a length of the DAI information field in the uplink scheduling DCI to be set to N bits, wherein N is a preset value; or determining the length of the DAI information field in the uplink scheduling DCI as indicated by higher-layer signaling; or determining the length of the DAI information field in the uplink scheduling DCI according to ACK/NACK information fed back locally;

determining a length of the HARQ process number information field in the downlink scheduling DCI to be set to $\log_2(M)$ bits, wherein M represents the largest number of HARQ processes as supported in the system; or determining the length of the HARQ process number information field in the downlink scheduling DCI according to a reference TDD uplink-downlink configuration corresponding to PDSCH HARQ feedback of the FDD carrier; and determining a length of the DAI information field in the downlink scheduling DCI to be set to N bits, wherein N is a preset value; or determining the length of the DAI information field in the downlink scheduling DCI as indicated by higher-layer signaling; or determining the length of the DAI information field in the downlink scheduling DCI according to ACK/NACK information fed back locally.

11. An apparatus for transmitting Downlink Control Information (DCI), applicable to a scenario where a Time Division Duplex (TDD) carrier and a Frequency Division Duplex (FDD) carrier are aggregated, the apparatus comprising:

a master control unit configured, for transmission of DCI over any current carrier, the current carrier being a TDD carrier or an FDD carrier to be scheduled, to determine Downlink Assignment Index (DAI) information fields in uplink scheduling DCI and downlink scheduling DCI to be carried over the current carrier and a Hybrid Automatic Repeat ReQuest (HARQ) process number information field in the downlink scheduling DCI dependent a duplex mode of a primary carrier, wherein a uplink scheduling DCI to be carried over a current TDD carrier comprises no DAI field the same as a uplink scheduling DCI carried over a primary FDD carrier, a downlink scheduling DCI to be carried over the current TDD carrier comprises no DAI field and 3 bits HARQ process number information field the same as downlink scheduling DCI carried over the primary FDD carrier, or a uplink scheduling DCI to be carried over a current FDD carrier comprises 2 bits of DAI field the same as a uplink scheduling DCI carried over a primary TDD carrier, a downlink scheduling DCI to be carried over the current FDD carrier comprises 2 bits of DAI and 4 bits of HARQ process number information fields the same as a downlink scheduling DCI carried over the primary TDD carrier; and to determine an Uplink (UL) index information field in the uplink scheduling DCI to be carried over the current carrier dependent upon a Physical Uplink Shared Channel (PUSCH) scheduling scheme currently used for the current carrier; and a communication unit configured to generate the corresponding uplink scheduling DCI and downlink scheduling DCI from results of determining the respective information fields and to transmit the uplink scheduling DCI and the downlink scheduling DCI to UE over the current carrier.

12. The apparatus according to claim 11, wherein if the PUSCH scheduling scheme currently used for the current carrier is to transmit PUSCH scheduling information for different uplink subframes respectively in different downlink subframes, then the master control unit determines an UL index information field in the uplink scheduling DCI to be carried over the current carrier at least by:

setting no UL index information field in the uplink scheduling DCI.

13. The apparatus according to claim 11, wherein if the PUSCH scheduling scheme currently used for the current carrier is to transmit PUSCH scheduling information for different uplink subframes in a same downlink subframe, then the master control unit determines an UL index information field in the uplink scheduling DCI to be carried over the current carrier at least by:

if the current carrier is a TDD carrier, setting a length of the UL index information field in the uplink scheduling DCI to M bits, wherein M is a preset value; or setting the length of the UL index information field in the uplink scheduling DCI as indicated by higher-layer signaling; and if the current carrier is an FDD carrier, setting the length of the UL index information field in the uplink scheduling DCI to $\lceil \log_2(P) \rceil$ bits, wherein P represents the largest number of a plurality of uplink subframes scheduled in a same downlink subframe as supported for use in the system; or setting the length of the UL index information field in the uplink scheduling DCI as indicated by higher-layer signaling; or setting the length of the UL index information field in the uplink scheduling DCI to $\lceil \log_2(Q) \rceil$ bits, wherein Q represents the largest number of a plurality of uplink subframes scheduled in a same downlink subframe over the currently aggregated carriers; or setting the length of the UL index information field in the uplink scheduling DCI to A bits, wherein A represents the largest number of a plurality of uplink subframes scheduled in a same downlink subframe as supported for use in the system; or setting the length of the UL index information field in the uplink scheduling DCI to B bits, wherein B represents the largest number of a plurality of uplink subframes scheduled in a same downlink subframe over the currently aggregated carriers.

14. The apparatus according to claim 11, wherein if the primary carrier is a FDD carrier, then the master control unit determines DAI information fields in uplink scheduling DCI and downlink scheduling DCI to be carried over the current carrier and an HARQ process number information field in the downlink scheduling DCI at least by:

setting no DAI information field in the uplink scheduling DCI; and setting no DAI information field and setting the HARQ process number information field to 3 bits in the downlink scheduling DCI.

15. The apparatus according to claim 11, wherein if the primary carrier is a TDD carrier, then the master control unit determines DAI information fields in uplink scheduling DCI and downlink scheduling DCI to be carried over the current carrier and an HARQ process number information field in the downlink scheduling DCI at least by:

setting a length of the DAI information field in the uplink scheduling DCI to N bits, wherein N is a preset value; or setting the length of the DAI information field in the uplink scheduling DCI as indicated by higher-layer signaling; or setting the length of the DAI information field in the uplink scheduling DCI according to ACK/NACK information fed back by the UE;

setting a length of the HARQ process number information field in the downlink scheduling DCI to $\log_2(M)$ bits, wherein M represents the largest number of HARQ processes as supported in the system; or setting the length of the HARQ process number information field in the downlink scheduling DCI according to a reference TDD uplink-downlink configuration corresponding to PDSCH HARQ feedback of the FDD carrier; and setting a length of the DAI information field in the downlink scheduling DCI to N bits, wherein N is a preset value; or setting the length of the DAI information field in the downlink scheduling DCI as indicated by higher-layer signaling; or setting the length of the DAI information field in the downlink scheduling DCI according to ACK/NACK information fed back by the UE.

16. An apparatus for processing Downlink Control Information (DCI), applicable to a scenario where a Time Division Duplex (TDD) carrier and a Frequency Division Duplex (FDD) carrier are aggregated, the apparatus comprising:

a processing unit configured, for processing of DCI transmitted over any current carrier, the current carrier being a TDD carrier or an FDD carrier to be schedule, to determine Downlink Assignment Index (DAI) information fields in uplink scheduling DCI and downlink scheduling DCI to be carried over the carrier and a Hybrid Automatic Repeat ReQuest (HARQ) process number information field in the downlink scheduling DCI dependent upon a duplex mode of a primary carrier, wherein a uplink scheduling DCI to be carried over a current TDD carrier comprises no DAI field the same as a uplink scheduling DCI carried over a primary FDD carrier, a downlink scheduling DCI to be carried over the current TDD carrier comprises no DAI field and 3 bits HARQ process number information field the same as downlink scheduling DCI carried over the primary FDD carrier, or a uplink scheduling DCI to be carried over a current FDD carrier comprises 2 bits of DAI field the same as a uplink scheduling DCI carried over a primary TDD carrier, a downlink scheduling DCI to be carried over the current FDD carrier comprises 2 bits of DAI and 4 bits of HARQ process number information fields the same as a downlink scheduling DCI carried over the primary TDD carrier; and to determine an Uplink (UL) index information field in the uplink scheduling DCI to be carried over the current carrier dependent upon a Physical Uplink Shared Channel (PUSCH) scheduling scheme currently used for the current carrier; and a communication unit configured to parse the uplink scheduling DCI and the downlink scheduling DCI according to the respective information fields upon reception of the uplink scheduling DCI and the downlink scheduling DCI, transmitted from network side, over the current carrier.

17. The apparatus according to claim 16, wherein if the PUSCH scheduling scheme currently used for the current carrier is to transmit PUSCH scheduling information for different uplink subframes respectively in different downlink subframes, then the processing unit determines an UL index information field in the uplink scheduling DCI to be carried over the current carrier at least by:

determining no UL index information field to be set in the uplink scheduling DCI.

18. The apparatus according to claim 16, wherein if the PUSCH scheduling scheme currently used for the current carrier is to transmit PUSCH scheduling information for different uplink subframes in a same downlink subframe, then the processing unit determines an UL index information field in the uplink scheduling DCI to be carried over the current carrier at least by:

if the current carrier is a TDD carrier, determining the length of the UL index information field in the uplink scheduling DCI to be set to M bits, wherein M is a preset value; or determining the length of the UL index information field in the uplink scheduling DCI as indicated by higher-layer signaling; and if the current carrier is an FDD carrier, determining the length of the UL index information field in the uplink scheduling DCI to be set to $\lceil \log_2(P) \rceil$ bits, wherein P represents the largest number of a plurality of uplink subframes scheduled in a same downlink subframe as supported for use in the system; or determining the length of the UL index information field in the uplink scheduling DCI as indicated by higher-layer signaling; or determining the length of the UL index information field in the uplink scheduling DCI to be set to $\lceil \log_2(Q) \rceil$ bits, wherein Q represents the largest number of a plurality of uplink subframes scheduled in a same downlink subframe over the currently aggregated carriers; or determining the length of the UL index information field in the uplink scheduling DCI to be set to A bits, wherein A represents the largest number of a plurality of uplink subframes scheduled in a same downlink subframe as supported for use in the system; or determining the length of the UL index information field in the uplink scheduling DCI to be set to B bits, wherein B represents the largest number of a plurality of uplink subframes scheduled in a same downlink subframe over the currently aggregated carriers.

19. The apparatus according to claim 16, wherein if the primary carrier is a FDD carrier, then the processing unit determines DAI information fields in uplink scheduling DCI and downlink scheduling DCI to be carried over the current carrier and an HARQ process number information field in the downlink scheduling DCI at least by:
  determining no DAI information field to be set in the uplink scheduling DCI; and
  determining no DAI information field to be set and the HARQ process number information field to be set to 3 bits in the downlink scheduling DCI.

20. The apparatus according to claim 16, wherein if the primary carrier is a TDD carrier, then the processing unit determines DAI information fields in uplink scheduling DCI and downlink scheduling DCI to be carried over the current carrier and an HARQ process number information field in the downlink scheduling DCI at least by:
  determining a length of the DAI information field in the uplink scheduling DCI to be set to N bits, wherein N is a preset value; or determining the length of the DAI information field in the uplink scheduling DCI as indicated by higher-layer signaling; or determining the length of the DAI information field in the uplink scheduling DCI according to ACK/NACK information fed back locally;
  determining a length of the HARQ process number information field in the downlink scheduling DCI to be set to $\log_2(M)$ bits, wherein M represents the largest number of HARQ processes as supported in the system; or determining the length of the HARQ process number information field in the downlink scheduling DCI according to a reference TDD uplink-downlink configuration corresponding to PDSCH HARQ feedback of the FDD carrier; and
  determining a length of the DAI information field in the downlink scheduling DCI to be set to N bits, wherein N is a preset value; or determining the length of the DAI information field in the downlink scheduling DCI as indicated by higher-layer signaling; or determining the length of the DAI information field in the downlink scheduling DCI according to ACK/NACK information fed back locally.

* * * * *